United States Patent [19]
Jefferson

[11] Patent Number: 6,044,673
[45] Date of Patent: Apr. 4, 2000

[54] LOCOMOTIVE CONTROLLER LOCKOUT DEVICE

[75] Inventor: Dean R. Jefferson, Maple Ridge, Canada

[73] Assignee: Inter-Pacific Services (1996) Ltd., Maple Ridge, Canada

[21] Appl. No.: 09/190,731

[22] Filed: Nov. 11, 1998

[51] Int. Cl.[7] .............................. G05G 5/00; F16B 13/04
[52] U.S. Cl. ........................ 70/212; 292/66; 292/257; 70/203; 70/14; 70/424; 70/57; 411/80
[58] Field of Search ............................. 70/203, 212, 57, 70/14, 163, 164, 177, 180, 34, 455, 424, 426, 428; 411/75–80, 26; 403/374.1, 374.2, 374.3, 374.4; 292/66, 182, 69, 257

[56] References Cited

U.S. PATENT DOCUMENTS

| | | | |
|---|---|---|---|
| 737,555 | 8/1903 | Dorn | 411/79 |
| 2,185,782 | 1/1940 | Brittin | 403/374.5 |
| 2,305,438 | 12/1942 | Michaels | 70/180 |
| 3,304,099 | 2/1967 | Jankowski . | |
| 3,496,742 | 2/1970 | Rothweiler et al. | 70/455 |
| 3,620,490 | 11/1971 | Roberts | 411/80 |
| 3,842,653 | 10/1974 | Blonn, Sr. . | |
| 4,512,099 | 4/1985 | Mathew . | |
| 4,605,350 | 8/1986 | Chater et al. | 411/75 |
| 4,706,437 | 11/1987 | Boecher, Jr. | 411/75 |
| 4,913,254 | 4/1990 | Castro et al. . | |
| 5,015,019 | 5/1991 | Razdolsky | 292/200 |
| 5,228,731 | 7/1993 | Glass | 411/79 |
| 5,285,698 | 2/1994 | Liao . | |
| 5,409,272 | 4/1995 | McCormack | 292/67 |
| 5,450,685 | 9/1995 | Peterson . | |
| 5,542,891 | 8/1996 | Kettle, Jr. et al. . | |
| 5,590,921 | 1/1997 | Holtman et al. | 292/257 |
| 5,699,687 | 12/1997 | Pittman . | |
| 5,832,755 | 11/1998 | Crilly | 70/58 |

FOREIGN PATENT DOCUMENTS

| | | | |
|---|---|---|---|
| 991341 | 6/1951 | France | 411/75 |
| 0585324 | 12/1977 | U.S.S.R. | 411/75 |
| 769790 | 3/1957 | United Kingdom | 411/75 |

*Primary Examiner*—Darnell M. Boucher
*Attorney, Agent, or Firm*—Dellett and Walters

[57] ABSTRACT

A locomotive locket device for disabling the forward/reverse control system of a locomotive or other powered railway vehicle has an axially-expandable plug portion which may be inserted into a keyhole chamber in a locomotive controller. The plug portion comprises upper and lower tubular truncated cylinders having complementary angled faces. When drawn together, the cylinders offset axially from one another, expanding their combined axial diameter. The device may be locked in a closed position.

6 Claims, 5 Drawing Sheets

LOCOMOTIVE CONTROLLER LOCKOUT DEVICE

TECHNICAL FIELD

The present invention relates to locking devices, and more particularly to a device for disabling the forward/reverse control system of a locomotive or other powered railway vehicle.

BACKGROUND

Most railway locomotives are operated by the manipulation by hand of three controls: a throttle control, a brake control and a forward/reverse direction control. Generally, these controls comprise handles movable between a plurality of operational positions. These controls are often, if not always, contained within an integrated controller unit. U.S. Pat. Nos. 3,842,653 (granted 22 Oct., 1974 to Blonn, Sr.) and 5,542,891 (granted 6 Aug., 1996 to Kettle, Jr.) show two similar types of integrated controller units used in most locomotives in North America.

In these common types of locomotive control systems the throttle and brake handles cannot be removed from the controller unit. However, the forward/reverse controller is a separate key-like handle (shown in FIG. 13 of the Blonn Sr. patent, and in FIG. 10 of the Kettle, Jr. patent) which must be inserted into a chamber or "keyhole" in the controller unit before the locomotive can be operated. The "key" typically has a generally circular profile, with a square ridge running the length of it. Similarly, the chamber has a generally circular cross section, but with a generally square or U-shaped groove running its length.

The handle, once inserted, can be moved between three positions: forward, reverse and neutral. The handle can only be inserted and removed when the controller is in the neutral position (ie. when the locomotive is at rest).

This forward/reverse control handle is typically removed from the controller unit when the train is not moving, especially when the train is "parked", thereby preventing the mistaken or unauthorized operation of the locomotive. The handle must be re-inserted before the locomotive can be operated. A significant problem exists with this system in that these handles are occasionally lost, misplaced and/or stolen, and may be used by unauthorized personnel, disgruntled employees and even joy riders and vagrants to move trains. This is not a trivial concern, since a significant number of such handles go missing every year.

A locking device is accordingly desired which can be lockedly inserted into the chamber normally occupied by the controller handle thereby preventing the insertion of an unauthorized handle. This disables the control unit and prevents unauthorized operation of the locomotive. Preferably, such a device would be small and lightweight, easily carried by those members of a train crew authorized to disable the locomotive.

SUMMARY OF INVENTION

The invention provides a lockout device for a locomotive controller, comprising generally an expandable cylindrical plug which fits into the chamber normally occupied by the forward/reverse handle.

In a preferred embodiment, the invention comprises a locomotive controller lockout device having a frame, an expandable plug attached to the frame and extending outwardly therefrom, the plug apparatus when in an open position insertable into the forward/reverse handle chamber in a locomotive controller unit, means for expanding the plug apparatus when the apparatus has been inserted into the chamber, thereby frictionally engaging the inside surface of the chamber.

In a further embodiment, the expandable plug apparatus comprises a first truncated cylindrical member contained within a socket formed in the frame, and a second truncated cylindrical member coaxially-aligned with the first cylindrical member. The means for expanding the plug apparatus comprises means for axially misaligning the members. This means for misaligning the members comprises a bolt passing through the first and second cylindrical members, the bolt threadably attached to the second cylindrical member thereby capable of drawing the cylinders together.

In yet a further embodiment of the invention, the device has a locking means which may comprise a flange having a hole through which a padlock may be fitted, locking the handle of the device into the "locked" position, preventing the device from being removed from the controller.

BRIEF DESCRIPTION OF DRAWINGS

In drawings which illustrate the preferred embodiment of the invention, but which should not be construed as restricting the spirit or scope of the invention in any way.

DESCRIPTION

Figure 1:
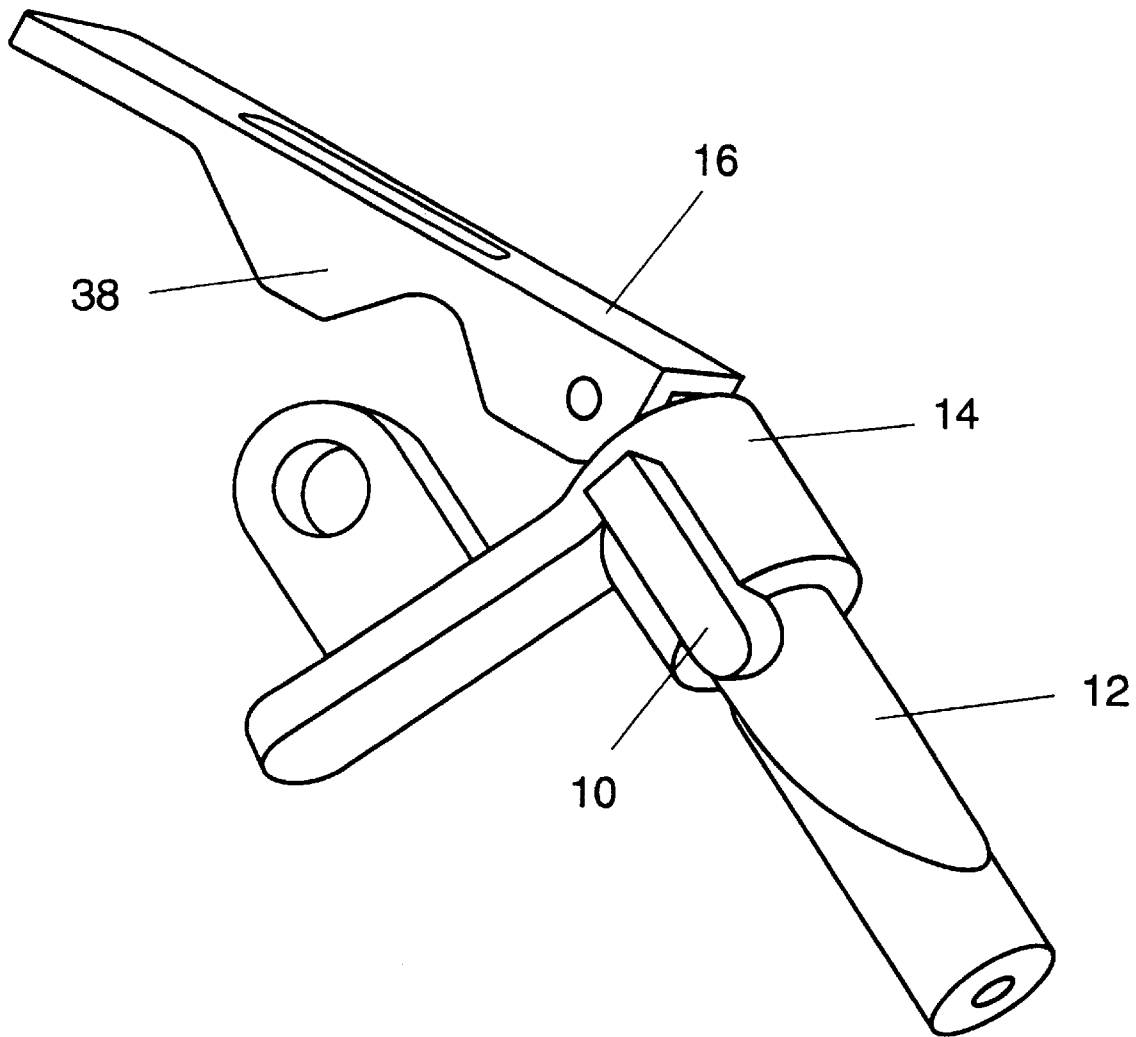
FIG. 1 is a perspective view of a lockout device made in accordance with the preferred embodiment of the invention.

Referring to FIG. 1, a locomotive controller lockout device made in accordance with one embodiment of the invention is denoted generally throughout the drawings by the numeral 10. Lockout device 10 has generally a plug portion 12, a frame portion 14 and a handle 16.

Figure 2:
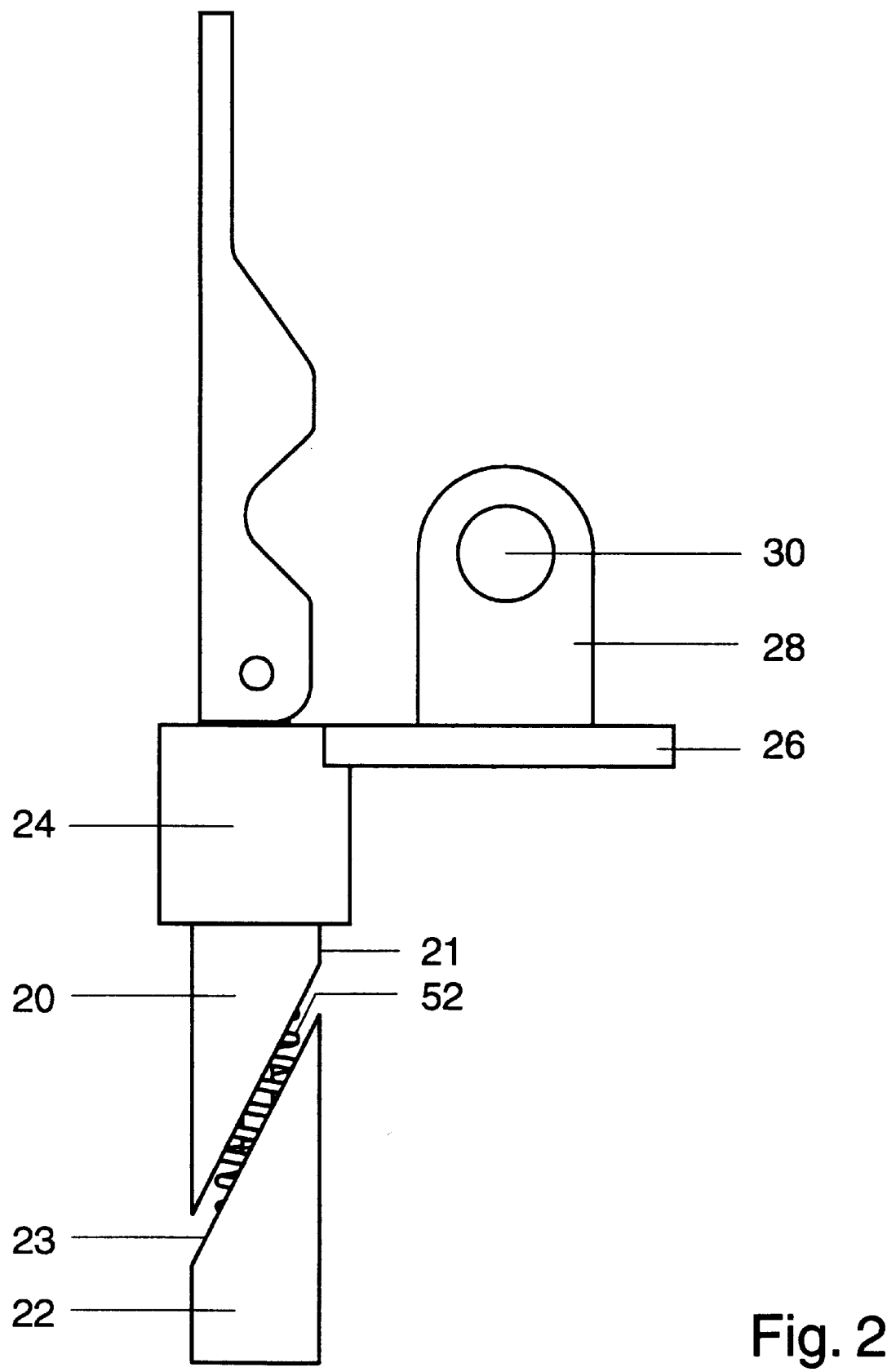
FIG. 2 is a side view of the device shown in FIG. 1, in an unlocked "open" position.
Figure 3:
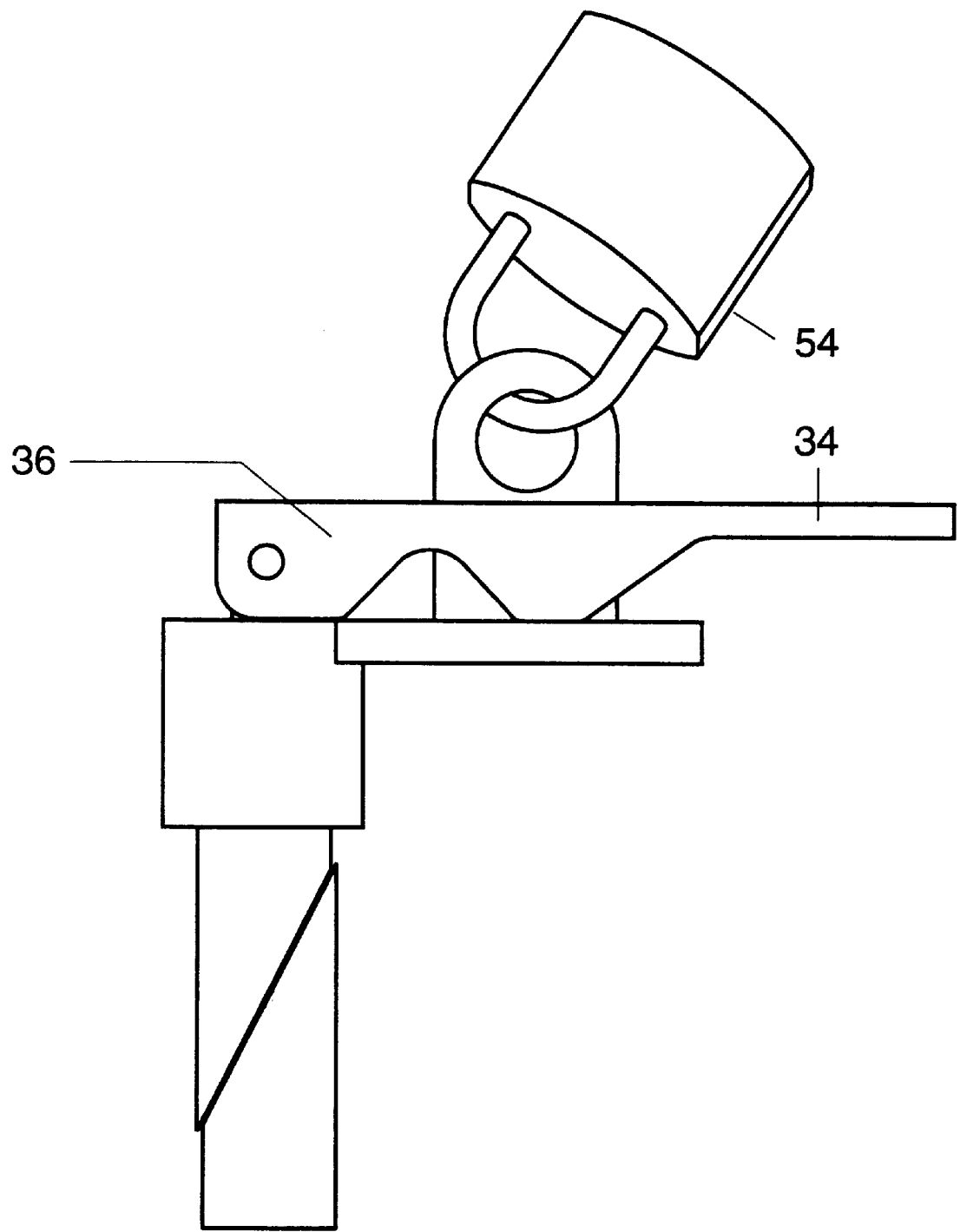
FIG. 3 is a side view of the device shown in FIG. 1, in a "closed" position, locked with a padlock.

Plug portion 12 comprises an upper tubular truncated cylinder 20 and a lower tubular truncated cylinder 22 (FIGS. 2 and 3). Truncated cylinders 20, 22 have complementary angled faces 21, 23 which face each other and abut one another when device 10 is in a closed position (FIG. 3). Preferably, cylinders 20, 22 are cast from a relatively soft material, such as an aluminum bronze alloy, for reasons to be described below.

Figure 4:
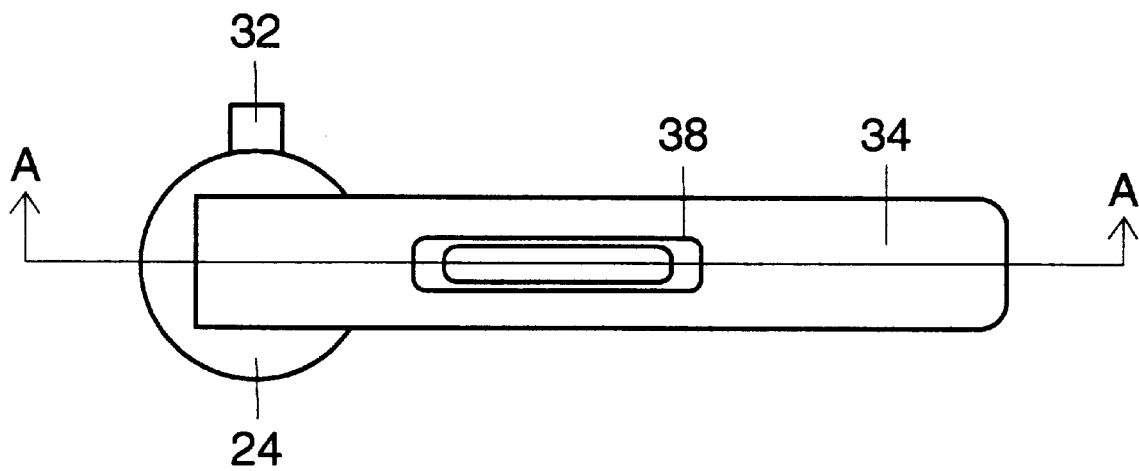
FIG. 4 is a top view of the device shown in FIG. 1, in a "closed" position.

Frame portion 14 of device 10 comprises a tubular frame cylinder 24 having a stem 26 extending perpendicularly from its top. In a preferred embodiment, a flange 28 having a hole 30 bored therethrough extends upwardly from the top surface of stem 26. Frame cylinder 24 also bears detent member 32 on its outer surface (FIG. 4). Detent member 32 preferably extends beyond the lower end of frame cylinder 24, as shown in FIG. 1, and covers a portion of upper cylinder 20 when device 10 is assembled, as discussed below.

Referring to FIGS. 3 and 4, handle 16 comprises a flat top portion 34, a first side wall 36 and a similar second side wall 38 (shown in FIG. 1). Top portion 34 has an obround slot 38 passing therethrough.

Figure 5:
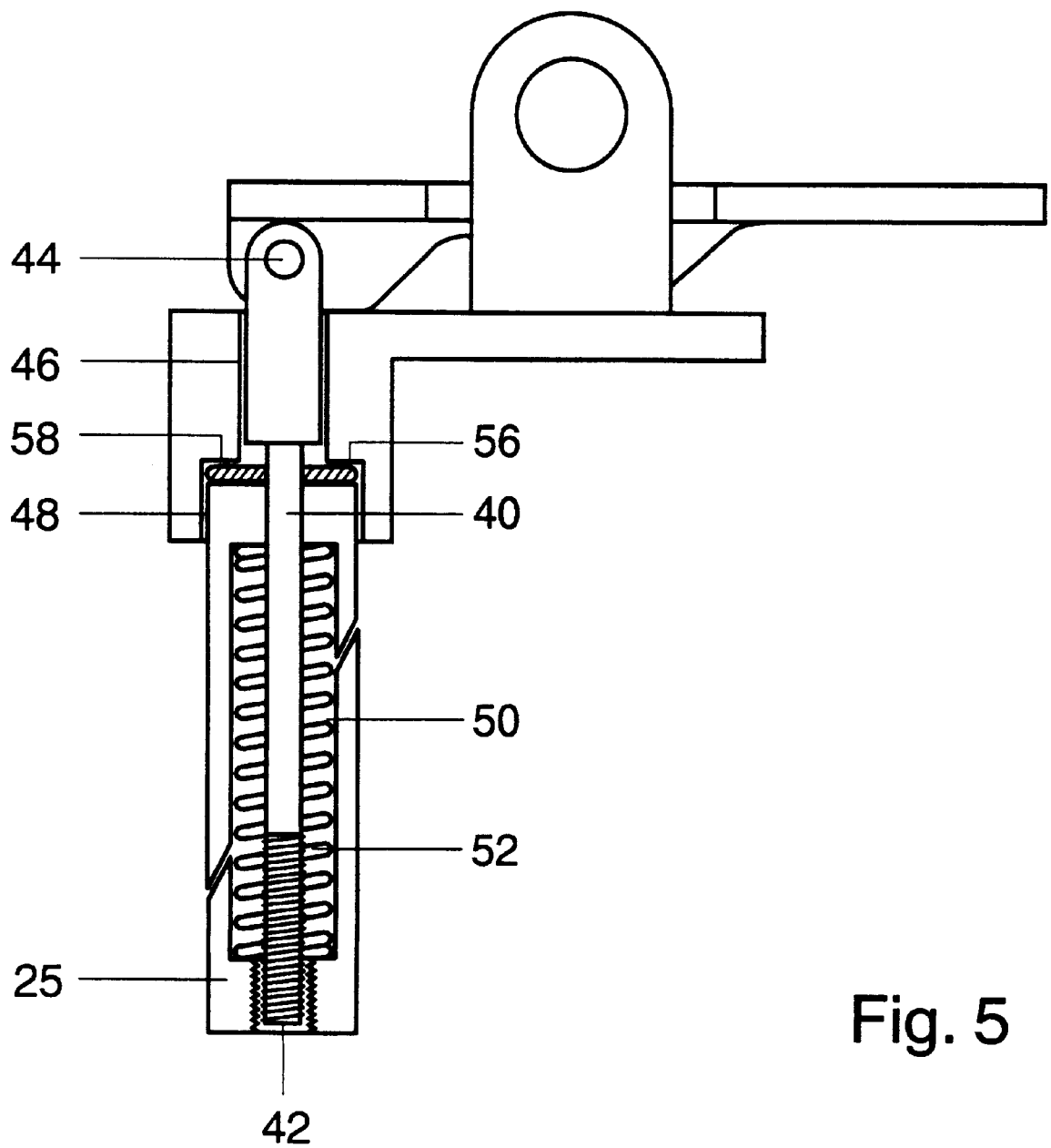
FIG. 5 is a cross-sectional view of the device shown in FIG. 1, taken along section line A—A of FIG. 4.

Lockout device 10 is assembled as shown in FIG. 5. A bolt 40 having a lower threaded end 42 is pivotally attached at its upper end to one end of handle 16, conveniently by a pin 44 passing through wall 36, bolt 40 and wall 38. Bolt 40 passes through a bore 46 formed through frame cylinder 24. Upper truncated cylinder 20 is fitted snugly within a socket 48 formed in the bottom end of frame cylinder 24. Bolt 40 passes through cylinder 20, and is threaded into lower truncated cylinder 22 at its lower end 25. When device 10 is assembled, cylinders 20, 22 are generally coaxially-aligned, with angled faces 21 and 23 facing one another.

Cylinders 20, 22 both have bores having a narrow portion and a wide portion, the respective wide portions open to angled faces 21, 23, together forming a chamber 50 when device 10 is assembled. A spring 52 is contained within chamber 50, tending to urge apart cylinders 20, 22.

As will be readily appreciated, raising bolt 40 upwardly tends to bring cylinders 20, 22 together. As shown in FIGS. 2, 3 and 5, the pivotally attached end of handle 16 acts as a cam, drawing bolt 40 upwardly when in a closed position (FIG. 3), and allowing bolt 40 to be urged downwardly by spring 52 when in an open position (FIG. 2). It will be appreciated by those skilled in the art that when device 10 is in an open position (ie. when handle 16 is in a raised position), cylinders 20, 22 are generally axially-aligned and, in turn, plug portion 12 has a relatively constant diameter. However, when bolt 40 is drawn upwardly, by lowering handle 16, lower cylinder 22 is drawn not only upwardly, but also along angled face 21 of upper cylinder 20, thereby becoming non-axially aligned therewith, and expanding the longitudinal or cross sectional profile of plug portion 12.

It will further be appreciated that the operating range of device 10 can be adjusted by threading or unthreading bolt 40 into lower cylinder 22 while device 10 is in an open position. Since the absolute amount of travel of bolt 40 is rendered constant by the shape of the end of handle 16, a greater threading of bolt 40 into cylinder 22 results in a greater final expansion, since cylinder 22 is drawn upwardly and outwardly to a greater extent relative cylinder 20.

In operation, when it is desired that a locomotive controller unit be locked, or disabled, the normal forward/reverse handle is first placed into a neutral position and then removed from its generally cylindrical keyhole chamber (not shown). As noted above, the keyhole chamber typically has a U-shaped or square groove formed on one side of it to accept the typical "key".

The lockout device 10 is then placed within the keyhole chamber in an "open", or non-expanded position. Device 10 is then rotated until detent member 32 occupies this typical square groove, thereby fixing frame portion 14 of device 10 relative the control unit. As noted above, plug portion 12 is preferably constructed of a relatively soft metal to avoid undue scratching or other damage of the interior of the control unit. On the other hand, frame portion 14 is preferably constructed of a strong material such as heat treated alloy steel, to prevent breakage. For safer operation, an elastomeric washer or O-ring 56 (FIG. 5) may be added to socket 48 between annular socket face 58 and the end of cylinders 20 inserted into socket 48. O-ring 56 dissipates excess force which might otherwise cause either or both of cylinders 20, 22 to damage the control unit keyhole chamber.

With device 10 in place within the control unit, in an open position, the handle 16 is turned, threading bolt 40 into cylinder 22. This draws cylinders 20, 22 together until plug portion 12 expands enough to lightly grip the inside surface of the keyhole chamber. Cylinder 20 does not move relative frame 14 when bolt 40 is turned, since it is tightly frictionally inserted into socket 48.

Handle 16 is then lowered, expanding plug portion 12 even further so that device 10 cannot be removed by hand. Handle 16 may then be locked with locking means such as a padlock 54, as shown in FIG. 3. If handle 16 cannot be lowered because plug portion 2 is already too tightly expanded in the keyhole chamber, device 10 may be loosened by turning handle 16 by one or two turns. Conveniently, in general operation a plurality of keys will be made for padlock 54, allowing any authorized person to unlock padlock 54 and remove device 10.

As will be apparent to those skilled in the art in the light of the foregoing disclosure, many alterations and modifications are possible in the practice of this invention without departing from the spirit or scope thereof. For example, although throughout this description reference is made to cylindrical members, it will be appreciated that it is not necessary that such members be cylindrical. It is simply convenient that they be so, since most keyhole chambers have circular profiles. It may well be that in some applications square members would be more fruitfully employed. Also, for example, means for locking the handle into a locked position may comprise locking means other than flange 28 and padlock 54. Finally, for example, flange 28 may have bored therethrough a plurality of holes to allow acceptance of a plurality of padlocks for extra security.

Accordingly, the scope of the invention is to be construed in accordance with the substance defined by the following claims.

What is claimed is:

1. A locomotive controller lockout device comprising:
   a) a frame having a cylindrical portion and a stem portion;
   b) a socket formed within said cylindrical portion;
   c) a first tubular truncated cylindrical member contained within said socket, said member having an angled face facing away from said socket;
   d) a second tubular truncated cylindrical member axially aligned with said first member, said second member having an upwardly facing angled face facing said angled face on said first member;
   e) a bolt passing axially through said first and second cylindrical members and threadably attached at a first end to said second member;
   f) a spring surrounding a portion of said bolt, normally urging said first and second members apart; and
   g) a handle pivotally attached to a second end of said bolt, said handle having a top portion and a cammed end adapted to move said bolt upwardly when in a closed position, and downwardly when in an open position.

2. A locomotive controller lockout device as claimed in claim 1 further comprising locking means for locking said handle into said closed position.

3. A locomotive controller lockout device as claimed in claim 2 further comprising an elastomeric washer contained within said socket between a face of said socket and said first tubular truncated cylindrical member.

4. A locomotive controller lockout device as claimed in claim 3 wherein said locking means comprises a flange extending from the top of said handle, said flange having a hole bored therethrough for receiving the shackle of a padlock.

5. A locomotive controller lockout device as claimed in claim 4 further comprising a detent member affixed on the side of said cylindrical portion.

6. A locomotive controller lockout device as claimed in claim 5 wherein said cylindrical members are made of an aluminum bronze alloy.

* * * * *